(No Model.)
J. P. RHOADS.
HARROW ATTACHMENT FOR PLOWS.
No. 467,020. Patented Jan. 12, 1892.
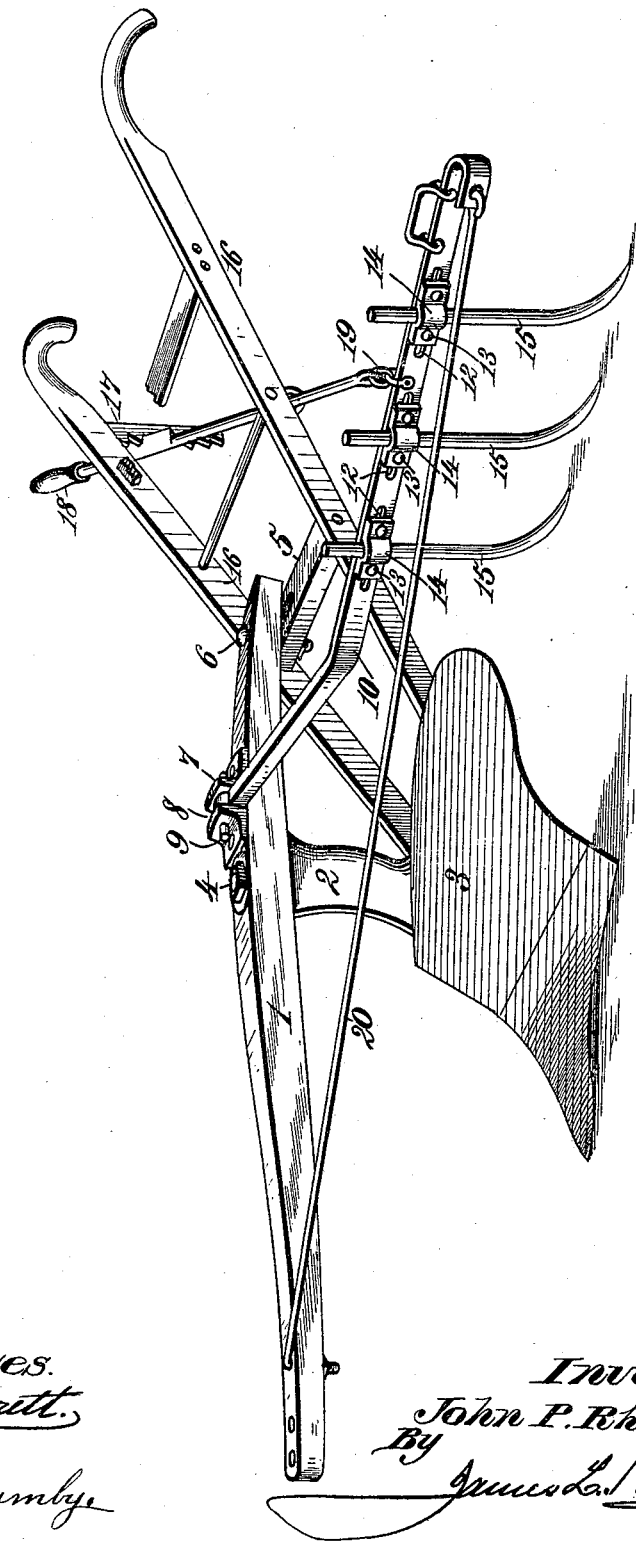
Witnesses.
Robert Everett.
Dennis Sumby.
Inventor.
John P. Rhoads.
By James L. Norris.
Atty.

UNITED STATES PATENT OFFICE.

JOHN P. RHOADS, OF CLIFTON, WEST VIRGINIA.

HARROW ATTACHMENT FOR PLOWS.

SPECIFICATION forming part of Letters Patent No. 467,020, dated January 12, 1892.

Application filed October 8, 1891. Serial No. 408,157. (No model.)

*To all whom it may concern:*

Be it known that I, JOHN P. RHOADS, a citizen of the United States, residing at Clifton, in the county of Mason and State of West Virginia, have invented new and useful Improvements in Harrow Attachments for Plows, of which the following is a specification.

This invention has for its object to provide a novel harrow attachment and adjusting devices for plows, whereby the harrow can be conveniently manipulated for elevating it from the soil at any time and for turning or throwing the plow around at the end of a furrow.

The invention consists in the combination, with a plow-beam and plow-handles, of a vertical ratchet-bar suspended from one of the plow-handles, a casting or bracket secured to the plow-beam, a tooth-carrying beam pivoted at one end to the casting or bracket, and a vertically-swinging lever fulcrumed intermediate its end portions to one of the plow-handles, jointed at its outer end to the tooth-carrying beam, and having its inner end movable beside the suspended ratchet-bar to engage and disengage the same.

The invention is illustrated by the accompanying drawing, in which the figure is a perspective view of a plow provided with my improved harrow attachment.

In order to enable those skilled in the art to make and use my invention, I will now describe the same in detail, referring to the drawing, wherein—

The numeral 1 indicates a plow-beam, 2 a standard, and 3 a plow, all of which may be of any desired construction suitable for the conditions required. The plow-beam is pivoted to the standard, as at 4, and at its rear extremity is adjustably connected to a cross-bar 5, through the medium of a clamping-bolt 6, so that the forward end of the beam can be adjusted to and from the landside.

The plow-beam is provided in rear of its pivot 4 with a casting or bracket 7, having a slot 8, in which is pivoted, by a pin or bolt 9, one extremity of a tooth-carrying bar 10. This bar is so bent or shaped as to extend rearwardly, and along its length is provided with a series of slots 12 to receive the transverse clamping-bolts 13, by which a series of tooth-holding clips 14 are secured in any position of adjustment along the length of the bar. The harrow-teeth 15 are clamped to the sides of the bar by the clips 14 and their clamping-bolts 13, the construction of the slots and other parts being such that the harrow-teeth can be adjusted toward or from each other to suit the conditions required. The harrow-teeth can also be adjusted vertically to vary their depth of penetration.

The handles 16 of the plow are of any desired construction, and one of them is provided with a pendent ratchet-bar 17 for engaging and locking one extremity of a hand-lever 18. This hand-lever is pivoted to the other plow-handle at the point 18, and its outer extremity is loosely connected with the tooth-carrying bar, through the medium of a suitable flexible connection 19, in such manner that by swinging the lever on its pivotal attachment 18 the tooth-carrying bar is raised or lowered for the purpose of raising or lowering the harrow-teeth. By depressing the lever and engaging it with the ratchet-bar the harrow will be elevated and held in such elevated position.

The construction and arrangement described provide a simple and efficient harrow attachment for a plow, which can be conveniently manipulated by the pivoted lever for the purpose of raising or lowering the harrow at any time, and especially when it is desired to turn or throw the plow around at the end of a furrow.

The outer extremity of the tooth-carrying bar is connected by a tie rod or wire 20 with the forward portion of the plow-beam for the purpose of resisting back strain on the harrow attachment.

The harrow fulfills all the conditions required to pulverize and place the soil in proper condition after the furrows are produced by the plow.

Having thus described my invention, what I claim is—

The combination, with a plow-beam and plow-handles, of a vertical ratchet-bar suspended from one of the plow-handles, a casting or bracket secured to the plow-beam, a tooth-carrying beam pivoted at one end to the casting or bracket, and a vertically-swinging lever fulcrumed intermediate its end portions to one of the plow-handles, jointed at its outer end to the tooth-carrying beam and having its inner end movable beside the suspended ratchet-bar to engage and disengage the same, substantially as described.

In testimony whereof I have hereunto set my hand and affixed my seal in presence of two subscribing witnesses.

JOHN P. RHOADS. [L. S.]

Witnesses:
 A. B. WOODRUM,
 JOHN DORNICK.